(12) United States Patent
Elgin

(10) Patent No.: US 9,545,087 B2
(45) Date of Patent: Jan. 17, 2017

(54) REVERSIBLE FISH LURE AND METHOD OF MAKING

(71) Applicant: Russell Allen Elgin, Snohomish, WA (US)

(72) Inventor: Russell Allen Elgin, Snohomish, WA (US)

( * ) Notice: Subject to any disclaimer, the term of this patent is extended or adjusted under 35 U.S.C. 154(b) by 55 days.

(21) Appl. No.: 13/944,628

(22) Filed: Jul. 17, 2013

(65) Prior Publication Data

US 2014/0020277 A1    Jan. 23, 2014

Related U.S. Application Data

(60) Provisional application No. 61/672,521, filed on Jul. 17, 2012.

(51) Int. Cl.
*A01K 85/00* (2006.01)
*A01K 85/14* (2006.01)

(52) U.S. Cl.
CPC .............. *A01K 85/14* (2013.01); *A01K 85/00* (2013.01)

(58) Field of Classification Search
CPC ................................ A01K 85/00; A01K 85/14
USPC ...................... 43/42.22, 42.23, 42.32, 42.34, 42.36, 43/42.5, 42.52, 42.51
See application file for complete search history.

(56) References Cited

U.S. PATENT DOCUMENTS

| | | | | |
|---|---|---|---|---|
| 1,179,964 A | * | 4/1916 | Robertson | 43/42.34 |
| 1,463,858 A | | 8/1923 | Wandve | |
| 2,235,905 A | * | 3/1941 | Sherwood | 43/42.29 |
| 2,463,889 A | * | 3/1949 | Lundemo | 43/42.39 |
| 2,518,213 A | | 8/1950 | Wood | |
| 2,608,787 A | * | 9/1952 | Krogue | 43/42.51 |
| 2,788,604 A | | 4/1957 | Sleight | |
| 3,056,228 A | * | 10/1962 | Stackhouse | 43/42.51 |
| 3,229,407 A | * | 1/1966 | Quyle | 43/42.18 |
| 3,305,964 A | * | 2/1967 | Wieszeck | 43/42.03 |
| 3,378,946 A | * | 4/1968 | Irvin | 43/42.06 |
| 3,656,253 A | * | 4/1972 | Gaunt | 43/42.33 |
| 3,673,727 A | * | 7/1972 | Bauer | 43/42.5 |
| 3,729,850 A | | 5/1973 | Waters, Jr. | |
| 3,919,802 A | * | 11/1975 | Davis | 43/42.5 |
| 3,981,096 A | * | 9/1976 | Toivonen | A01K 85/14 |
| | | | | 43/42.39 |
| 4,122,624 A | * | 10/1978 | Smith | 43/42.33 |
| 4,201,006 A | * | 5/1980 | Wetherald | 43/42.06 |
| 4,479,323 A | * | 10/1984 | Burr | 43/42.5 |
| 4,594,806 A | | 6/1986 | Brown | |
| 4,914,849 A | | 4/1990 | Hook | |
| 5,197,221 A | | 3/1993 | Kresl | |
| 6,061,947 A | | 5/2000 | Mooers | |
| 6,202,338 B1 | * | 3/2001 | Carr | 43/42.5 |
| 6,618,979 B2 | | 9/2003 | Wacha | |

(Continued)

*Primary Examiner* — David Parsley
(74) *Attorney, Agent, or Firm* — Seed IP Law Group LLP

(57) ABSTRACT

A reversible lure and method of making in which a cam lever from a nail clipper is removed and suitable hook and line are attached to opposing ends thereof. The elongate body has opposing first and second ends and a central section with the first end having an angled section extending from the central section, an opening formed in the angled section, and a raised scoop formed on a first side of the central section adjacent the angled section with an interior in fluid communication with the opening in the angled section. A second end has an opening to accommodate a hook or fishing line. Preferably the lure is formed of metal having a polished finish that reflects light.

9 Claims, 3 Drawing Sheets

(56) References Cited

U.S. PATENT DOCUMENTS

| | | | |
|---|---|---|---|
| 7,216,456 B2* | 5/2007 | Kaariainen et al. | ............ 43/42.5 |
| 2002/0178643 A1 | 12/2002 | Brodeur | |
| 2006/0191186 A1 | 8/2006 | Perrick | |
| 2008/0229649 A1 | 9/2008 | Smith et al. | |

* cited by examiner

REVERSIBLE FISH LURE AND METHOD OF MAKING

BACKGROUND

Technical Field

The present disclosure is directed to fishing lures and, more particularly, to a lure used in spin casting, jigging, trolling, and other types of fishing techniques.

Description of the Related Art

Techniques for catching fish of all types include the use of a variety of devices, such as nets, traps, cages, harpoons, spears, and hooks. While some of these approaches are directed to acquiring a large number of fish in a single catch, the use of a single line in combination with a hook or other means to catch a fish has been known for thousands of years. Early fisherman used hand lines, which eventually evolved into the use of fishing rods for casting the line a long distance.

Also known is the use of live bait as well as artificial bait and lures to attract fish. Bait casting, spin casting, jigging, and trolling are the more common techniques for using a lure because movement of the lure in the water and reflection of light off the lure is used to simulate a prey for fish.

Of particular interest to the present disclosure is the metal or reflective lure used in spin casting, trolling, and jigging. Although lures of this type tend to be categorized as "spoon" lures due to the dished reflective surface, the spoon shape is not necessarily the easiest to manufacture and not always an attraction for fish.

BRIEF SUMMARY

The present disclosure is directed to a reversible lure for use in attracting fish and to a method of making the lure.

In accordance with one aspect of the present disclosure, a device is provided that has an elongate body with opposing first and second ends and a central section, the body having a generally planar shape with multiple opposing parallel first and second sides. The first end of the elongate body is an angled section extending from the central section and includes an opening formed in the angled section, the first end further incorporating a raised scoop formed on the first side of the central section adjacent the angled section. The second end has an opening formed therein, and a fishing hook is attached to the opening in the second end.

In accordance with another aspect of the present disclosure, the elongate body is preferably formed of metal having a polished finish that reflects light.

In accordance with a further aspect of the present disclosure, the angled section angles in a direction that forms an acute angle with the second side and an obtuse angle with the first side of the body.

In accordance with still yet another aspect of the present disclosure, the scoop has an open end facing towards the angled section and an interior in fluid communication with the opening in the angled section, and a closed end that tapers into the body in the central section.

In accordance with yet another aspect of the present disclosure, the second end angles away from the central section in a direction opposite that of the angled section to form an acute angle with the first side and an obtuse angle with the second side.

In accordance with a further aspect of the present disclosure a device is provided that includes an elongate body having a central section and opposing first and second ends, the body having a generally planar shape with mutually opposing parallel first and second sides, the first end having an angled section extending from the central section, the angled section having a convex shape that forms a spoon-shaped section, the second end having an opening formed therein; and a fishing hook attached to the opening in the second end.

In accordance with yet a another aspect of the present disclosure, a device is provided that includes an elongate body having a central section and opposing first and second ends, the body having a generally planar shape with mutually opposing parallel first and second sides, the first end having a bulge without an opening extending from the first side that creates a concave area on the second side, and an angled section extending from the bulge on the second side of the body and in a direction away from the first end at a first angle, the angled section having an opening and the second end having an opening formed therein.

BRIEF DESCRIPTION OF THE SEVERAL VIEWS OF THE DRAWINGS

The foregoing and other features and advantages of the present disclosure will be more readily appreciated as the same become better understood from the accompanying drawings when taken in conjunction with the detailed description that follows, wherein.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with fishing tackle, including but not limited to fishing rods, reels, and lines have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments. For ease of reference, similar structures and features will be illustrated and described using the same reference number.

Figure 1:
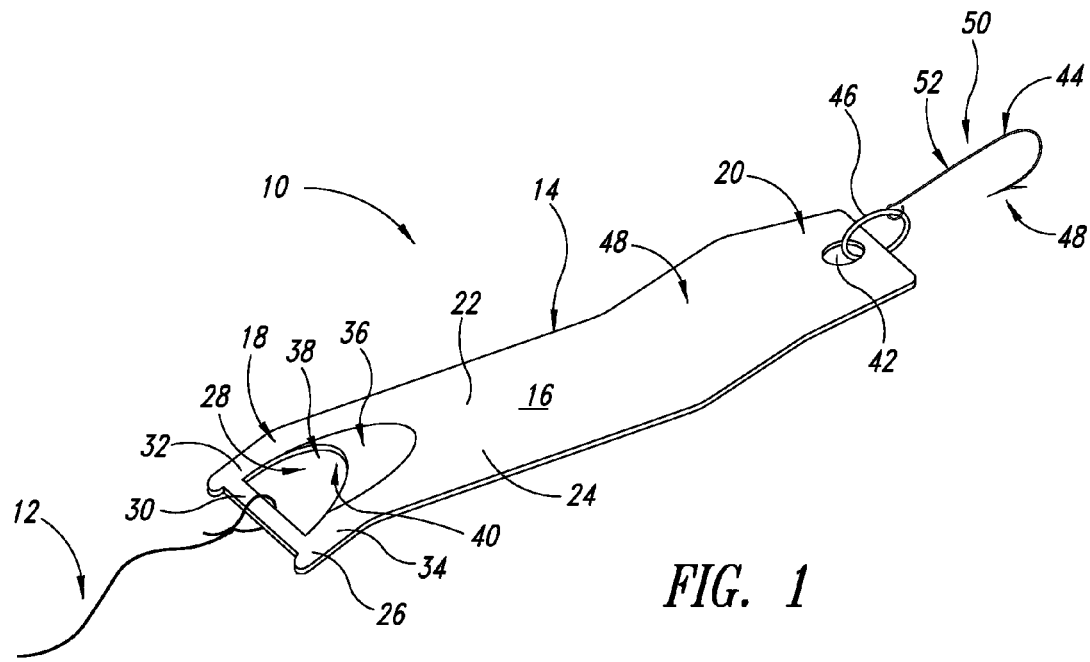
FIG. 1 is an isometric projection of a fishing lure and line formed in accordance with the present disclosure.
Figure 2:
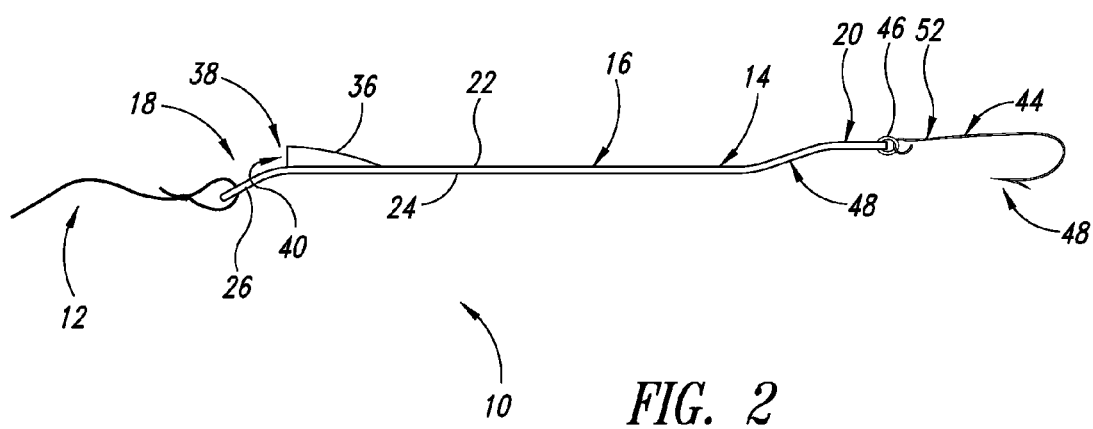
FIG. 2 is a side plan view of the fishing lure of FIG. 1.

Referring initially to FIGS. 1 and 2, shown therein is a device in the form of a fishing lure 10 attached to a line 12 that is further attached to a fishing reel and pole (not shown) to form a system in accordance with the present disclosure. The lure 10 includes an elongate body 14 having a central section 16 and opposing first and second ends 18, 20. The body preferably has a generally planar shape with mutually opposing parallel first and second sides 22, 24.

The first end 18 has an angled section 26 that extends away from the central section 16 such that it forms an acute angle with the second side 24 and an obtuse angle with the first side 22. The first end 18 includes an opening 28, preferably formed in the angled section 26 that creates a transverse bar 30 connected across two extending legs 32, 34. The line 12 is, in this embodiment, attached to the transverse bar 30. The attachment of the fishing line 12 to the transverse bar 30 can be by means of an optional split ring, swivel, or snap clip, which are known in the art and will not be described in detail herein.

The first end 18 also has a raised area or scoop 36 depending upward from the body 14 in a direction opposite that from which the angled section 26 extends, the scoop 36 having an opening 38 that communicates with an interior 40 of the scoop 36 and is in fluid communication with the opening 28 in the angled section 26.

A second end 20 has an opening 42 formed therein that is sized and shaped to accommodate a hook 44. Ideally the hook 44 is attached through the opening 42 at the second end 20 with a split ring 46 in a conventional manner that will not be described in more detail herein. The hook 44 will not be described in detail herein because there are many varieties that are readily commercially available. Briefly, the hook 44 is a typical fishing hook having a barbed end 48 and possibly one or more barbs 50 formed on a shank 52 thereof.

In a preferred or representative embodiment, the second end 20 of the lure 10 has an angled wall 54 that depends from the central section 16 in a direction opposite that of the angled section 26 to connect to the second end 20 where the opening 42 is formed. As shown in the side view of FIG. 2, the second end 20 is parallel to the central section 16, unlike the angled section 26 at the first end 18.

Figure 3:
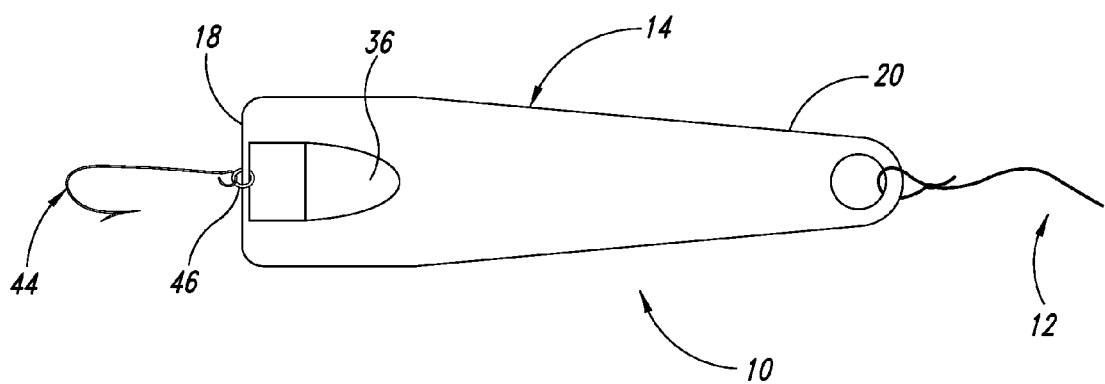
FIG. 3 is a top plan view of an alternative embodiment of the fishing lure of FIG. 1.

FIG. 3 is a top plan view of the lure 10 of FIGS. 1 and 2 with the connections of the line 12 and the hook 44 reversed. In other words the hook 44 is attached to the transverse bar 30 at the first end 18, preferably with a split ring or other suitable connector, and the line 12 is attached to the opening 42 formed at the second end 20, either by tying or with an optional snap ring, swivel, or snap clip. Thus, a benefit of the present design is that it can be used in either configuration shown in FIGS. 1 and 3.

Figure 4:
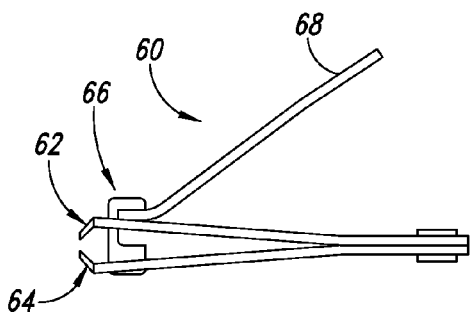
FIG. 4 is a side plan view of a known apparatus for clipping nails.
Figure 5:
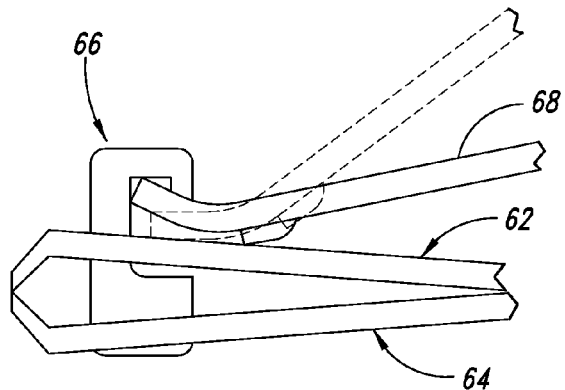
FIG. 5 is a side plan view of the known apparatus of FIG. 4 showing a step of removing a cam lever from the apparatus.

FIGS. 4 and 5 illustrate one method of making the lure 10. Shown therein is a conventional nail clipper 60 that has two spring steel jaws 62, 64 coupled together via a pin 66. A cam lever 68 engages the pin 66 and bears against the first jaw member 62 to urge it against the second jaw member 64 in a conventional manner that will not be described in detail herein.

In one embodiment of the present disclosure, the lure 10 is formed from the cam lever 68 of the nail clipper. In order to remove the cam lever 68 from the nail clipper 60, the first and second jaw members 62, 64 are urged together, such as with a pair of pliers (not shown). Once the jaw members 62, 64 are pushed together, the pin 66 is urged against the second jaw member 64, providing sufficient clearance for the transverse bar 30 of the cam lever 68 to disengage the pin 66. Once the cam lever 68 is free from the pin 66, the hook 44 can be attached to the desired end, and the line 12 can be attached to the opposing end as described above.

In the plan form view of FIG. 3, it can be seen that the elongate body 14 has longitudinal sides that taper from the first end inward towards the second end 20 such that the width of the body 14 reduces towards the second end 20. It is to be appreciated that various plan form configurations can be used to emulate the shape of certain types of small fish used as bait for the desired fish. It is also to be understood that the angles of the angled section 26 and the second end 20 can be varied to change the action of the lure as it is moving through the water. The scoop 36 on the first side 22 of the body 14 provides several functions. First, it simulates an aspect of a small fish, such as an eyeball or gill or fin. Secondly, the opening of the scoop 36 will catch and direct water to the second side 24 in combination with the opening 28 formed in the angled section 26. This also emulates an open mouth of a small fish as well as provides more realistic action of the lure in the water 10 while it is being reeled in or trolled.

When used in the reverse configuration shown in FIG. 3, the scoop 36 will resemble more of a tail fin or section of a tail fin on a fish. Because of the lack of symmetry with respect to the angled section 26, the embodiment shown in FIG. 3 will be asymmetrical as water flows through it or past it, causing an uneven action of the lure in the water and thereby simulating an injured minnow or similar prey. Likewise, the large opening 28 that forms the transverse bar 30 creates a large area on which the line 12 and its accompanying attachment member, such as a swivel or snap clip, can ride, allowing the lure to slide laterally back and forth with respect to the line 12. Thus, when used in the configuration shown in FIGS. 1 and 2, the lure can move back and forth in and out of balance with respect to the alignment of a longitudinal axis of the elongate body 14 and the line 12, causing action that will attract the attention of predator fish.

In accordance with a further aspect of the present disclosure, the lure 10 is designed to be used with a variety of fishing techniques, including spin casting, bait casting, jigging, and trolling. It may also be used with or without live bait, or other scent-emitting articles that are used to attract fish. For example, dough bait (scented) can be placed on the scoop section 36 of the lure.

In use, the lure can be vertically jigged using known jigging techniques. Alternatively, the "horizontal jigging" technique can be used where the lure is raised and dropped vertically while being reeled in horizontally. For this method the lure is slidably mounted on the line to move along the line towards and away from the end of the line and to spin about the line.

It is to be understood that size is not a limitation with respect to the design of the lure 10 inasmuch as nail clippers come in various sizes. Because of its design and finish, the lure 10 will be formed of metal, thus having a substantial weight and allowing it to be used in both open and closed water (ocean, lakes, rivers, streams) for a variety of sizes of fish.

Figure 6A:
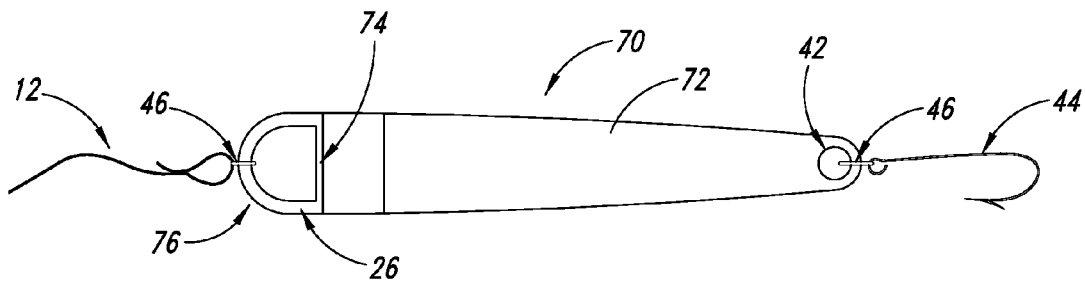
FIGS. 6A and 6B are top and side views respectively of an alternative fishing lure formed in accordance with the present disclosure.
Figure 6B:
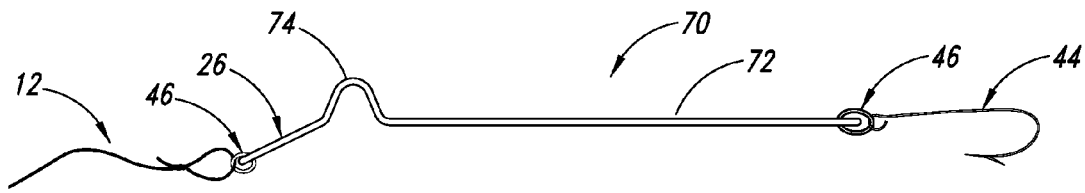

Referring next to FIGS. 6A and 6B, shown therein is another design of a fishing lure 70 in which a planar body 72 is provided that has a similar planform shape as the lure 10 described above. In this design, an enlarged hump 74 is provided that extends across an entire width of the body 72 near a first end 76, and before the angled section 26, creating a concave area beneath the hump 74. There is no scoop in this embodiment. The angled section 26 extends from the enlarged hump 74 at about an angle of 45 degrees to the first side of the body 72 and forming an obtuse angle with the second side of the body 72. The concave area and the hump 74 interact with the water when the lure is moving through the water to create an "action" in the lure that is attractive to fish. In all other respects, this design is similar to the lure 10 described above although variations are possible, such as the use of two split rings 46 instead of one.

Figure 7A:
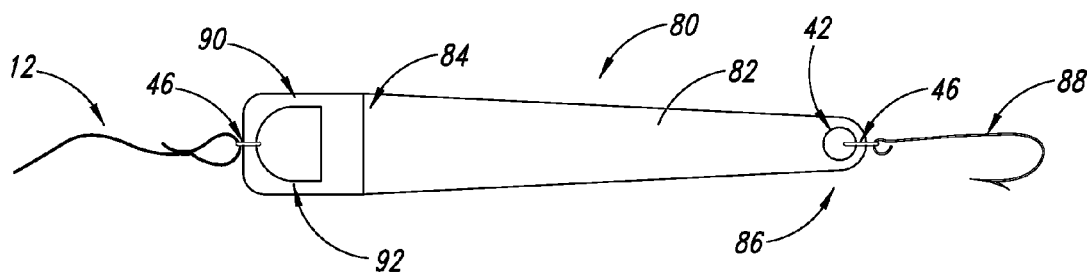
FIGS. 7A and 7B are top and side views, respectively, of a further alternative fishing lure formed in accordance with the present disclosure.
Figure 7B:
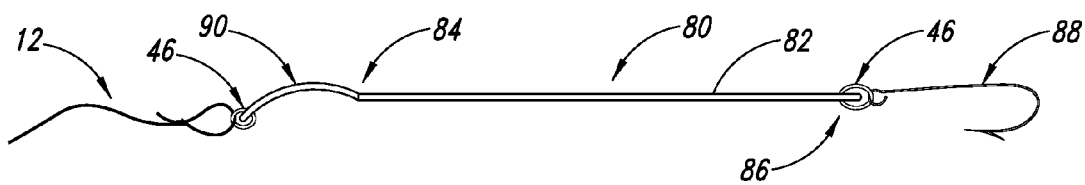

In FIGS. 7A and 7B a lure 80 is shown having a planar body 82 with a forward end 84 and rearward end 86 in which a hook 88 is attached to an opening 42 in the rearward end 86 with a split ring 46. At the forward end 84, instead of a scoop, there is an enlarged convex bulge or spoon-shaped section 90 that extends from the forward end 84 of the planar body 82. A split ring 46 is attached to an opening 92 in the spoon-shaped section 90 for attachment of the line 12. In this design, the convex bulge or spoon shaped section 90 functions as a scoop to allow water to flow through the opening 92 and below the body 82. The spoon-shaped section 90 has a concave area on the opposite side that in combination with the bulge and the planar body 82 creates an action when moving through the water that is attractive to fish.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A reversible fishing lure for use with a line and a hook in which the line and the hook can be connected at either end of the fishing lure, comprising:
   an elongate body having:
      a central section with opposing first and second ends, the central section having a generally planar shape with mutually opposing parallel first and second sides;
      a first angled section extending from the first end of the central section, the angled section having an opening formed therein that defines a transverse bar at a terminal end of the angled section that forms a termination of the elongate body and is capable of allowing an attached line and an attached hook to slide laterally thereon when the lure is moving through the water; wherein the first angled section angles away from the first end of the central section in a direction that forms an acute angle with the first side of the elongate body and an obtuse angle with the second side of the elongate body;
      a raised scoop formed on the first side of the central section adjacent the first angled section and having an open end forming an open mouth facing the first angled section that emulates the shape of an open mouth of a bait fish and a closed end that tapers into the central section of the body, and further including an open interior in fluid communication with the open end and with the opening in the first angled section, the opening in the first angled section having a curved portion partially extending into and partially bound by the raised scoop;
      a second angled section extending from the second end of the central section in a direction opposite that of the angled section to form an obtuse angle with the first side and an acute angle with the second side;
      a terminal end section extending from the second angled section to be substantially parallel to the central section, the terminal end having an opening formed therein sized and shaped to enable connection of the line and to enable connection of the fishing hook; and
   a fishing hook removably attached to one of the transverse bar and the opening in the terminal end.

2. The lure of claim 1, wherein the elongate body is formed of metal having a polished finish that reflects light.

3. The lure of claim 1 wherein the central section, the second angled section, and the terminal end have tapered longitudinal sides that taper from the first end of the central section and through the terminal end.

4. A reversible fishing lure for use with a line and a hook in which the line and the hook can be connected at either end of the fishing lure, comprising:
   an elongate body having a central section and opposing first and second ends, the first end having a width that is wider than a width of the second end, the body having a generally planar shape with mutually opposing parallel first and second sides, the first end having an angled section extending from the central section, the angled section having a convex shape that forms a spoon-shaped scoop section having a convex side and a corresponding concave side and an opening that defines a transverse bar at a terminal end of the angled section that is capable of allowing an attached line to slide laterally thereon when the lure is moving through the water, the transverse bar sized and shaped to allow connection of the line and to allow connection of the hook, the opening in the first angled section having a curved portion partially extending into and partially bound by the spoon-shaped scoop, the second end having an opening formed therein that is also sized and shaped to allow connection of the line and to allow connection of the hook; and
   a fishing hook attached to one of the transverse bar and the opening in the second end.

5. The lure of claim 4, wherein the elongate body is formed of metal having a polished finish that reflects light.

6. The lure of claim 4, wherein the angled section angles in a direction that forms an acute angle with the first side of the elongate body and an obtuse angle with the second side of the elongate body, and the concave side of the spoon-shaped scoop faces a same direction as the second side of the elongate body.

7. A reversible fishing lure for use with a line and a hook in which the line and the hook can be connected at either end of the fishing lure, comprising:
   an elongate body having a central section and opposing first and second ends, the first end having a wider width than the second end, the body having a generally planar shape to define a first plane with mutually opposing parallel first and second sides, the first end having a hump without an opening extending from the first side that creates a concave area on the second side under the hump and only under the first plane, the hump extending an entire width of the body, and a planar angled section extending from the hump on the second side of the body and in a direction away from the first end at a first angle, the planar angled section having a planar configuration that begins at an intersection of the first plane and the hump, the planar angled section having an opening that defines a planar-shaped intake to direct water into the concave area, and a transverse bar at a terminal end of the planar angled section that is sized and shaped to allow connection of the line and to allow connection of the hook and is capable of allowing a line attached to the transverse bar to slide laterally thereon and further to allow a hook attached to the transverse bar to slide laterally thereon when the lure is moving through the water, the opening in the planar angled section having a planar portion partially extending into and partially bound by the concave area under the hump, and the second end having an opening formed therein structured to receive a line and structured to receive a hook, the opening in the second end having a smaller size than the opening in the planar angled section.

8. The lure of claim 7, wherein the elongate body is formed of metal having a polished finish that reflects light.

9. The lure of claim 7, wherein the angled section angles in a direction that forms an acute angle of about 45 degrees with the first side of the elongate body and an obtuse angle with the second side of the elongate body.

\* \* \* \* \*